US012344478B2

(12) United States Patent
Zhang et al.

(10) Patent No.: US 12,344,478 B2
(45) Date of Patent: Jul. 1, 2025

(54) TRANSPORTING DEVICE AND HEATING DEVICE

(71) Applicant: FU DING ELECTRONICAL TECHNOLOGY (JIASHAN) CO.,LTD., Jiashan (CN)

(72) Inventors: Huan Zhang, Kunshan (CN); Qi Kuang, Kunshan (CN); Hua Wan, Kunshan (CN); Yi Liu, Jiashan (CN); Wei-Wei Wu, Kunshan (CN); Jing-Chao Yang, Kunshan (CN); Wen-Jin Xia, Kunshan (CN)

(73) Assignee: FU DING ELECTRONICAL TECHNOLOGY (JIASHAN) CO., LTD., Jiashan (CN)

( * ) Notice: Subject to any disclaimer, the term of this patent is extended or adjusted under 35 U.S.C. 154(b) by 90 days.

(21) Appl. No.: 18/396,917

(22) Filed: Dec. 27, 2023

(65) Prior Publication Data

US 2024/0124241 A1 Apr. 18, 2024

Related U.S. Application Data

(63) Continuation-in-part of application No. PCT/CN2021/132406, filed on Nov. 23, 2021.

(51) Int. Cl.

*B65G 17/12* (2006.01)
*B65G 17/18* (2006.01)
*F26B 15/18* (2006.01)

(52) U.S. Cl.

CPC .......... *B65G 17/123* (2013.01); *B65G 17/18* (2013.01); *F26B 15/18* (2013.01)

(58) Field of Classification Search

CPC ........ B65G 17/123; B65G 17/18; F26B 15/18

(Continued)

(56) References Cited

U.S. PATENT DOCUMENTS 1,411,247 A * 3/1922 Weilman ................ F26B 15/14 198/799
3,756,378 A * 9/1973 Kuehl ................. B65G 17/123 198/849

(Continued)

FOREIGN PATENT DOCUMENTS

CN 200979353 Y 11/2007
CN 205784426 U 12/2016
CN 212538531 U 2/2021

*Primary Examiner* — Mark A Deuble

(74) *Attorney, Agent, or Firm* — ScienBiziP, P.C.

(57) ABSTRACT

A transporting device can transport at least one product, the transporting device includes a mounting frame, a driving mechanism, a transmitting mechanism including a plurality of bent portions, a plurality of guiding mechanisms, and a supporting mechanism. Each guiding mechanism includes a rotating wheel and a guiding plate. Each bent portion is connected to the rotating wheel. The guiding plate is connected to the rotating wheel. The supporting mechanism can support the product. The driving mechanism is further connected to the rotating wheel and can drive the transmitting mechanism to rotate to drive the supporting mechanism to move. The driving mechanism is further connected to the guiding plate, the guiding plate and the rotating wheel can synchronously rotate to drive the supporting mechanism to pass through the bent portions. The present disclosure further provides a heating device.

19 Claims, 10 Drawing Sheets

100

(58) Field of Classification Search
USPC .................................................. 198/798–799
See application file for complete search history.

(56) References Cited

U.S. PATENT DOCUMENTS

| | | | | |
|---|---|---|---|---|
| 3,812,954 | A * | 5/1974 | Kaletin | B65G 17/34 198/800 |
| 6,336,549 | B1 * | 1/2002 | Jen | B65G 17/123 198/800 |
| 7,011,206 | B2 * | 3/2006 | Hornhofer | B65G 17/123 198/797 |
| 7,344,015 | B2 * | 3/2008 | Mustalahti | B65G 17/18 198/321 |
| 9,550,626 | B2 * | 1/2017 | Parodi | B07C 3/08 |
| 9,796,531 | B2 * | 10/2017 | Ishibashi | B65G 23/38 |
| 10,087,007 | B2 * | 10/2018 | Ishibashi | B65G 17/123 |

* cited by examiner

TRANSPORTING DEVICE AND HEATING DEVICE

FIELD

The subject matter herein generally relates to product processing, and more particularly, to a transporting device and a heating device.

BACKGROUND

During product processing, the product is moved through a transmission device to facilitate the processing of the product. However, when the product is transported longitudinally to different heights, the product may become unstable during the transmission process. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
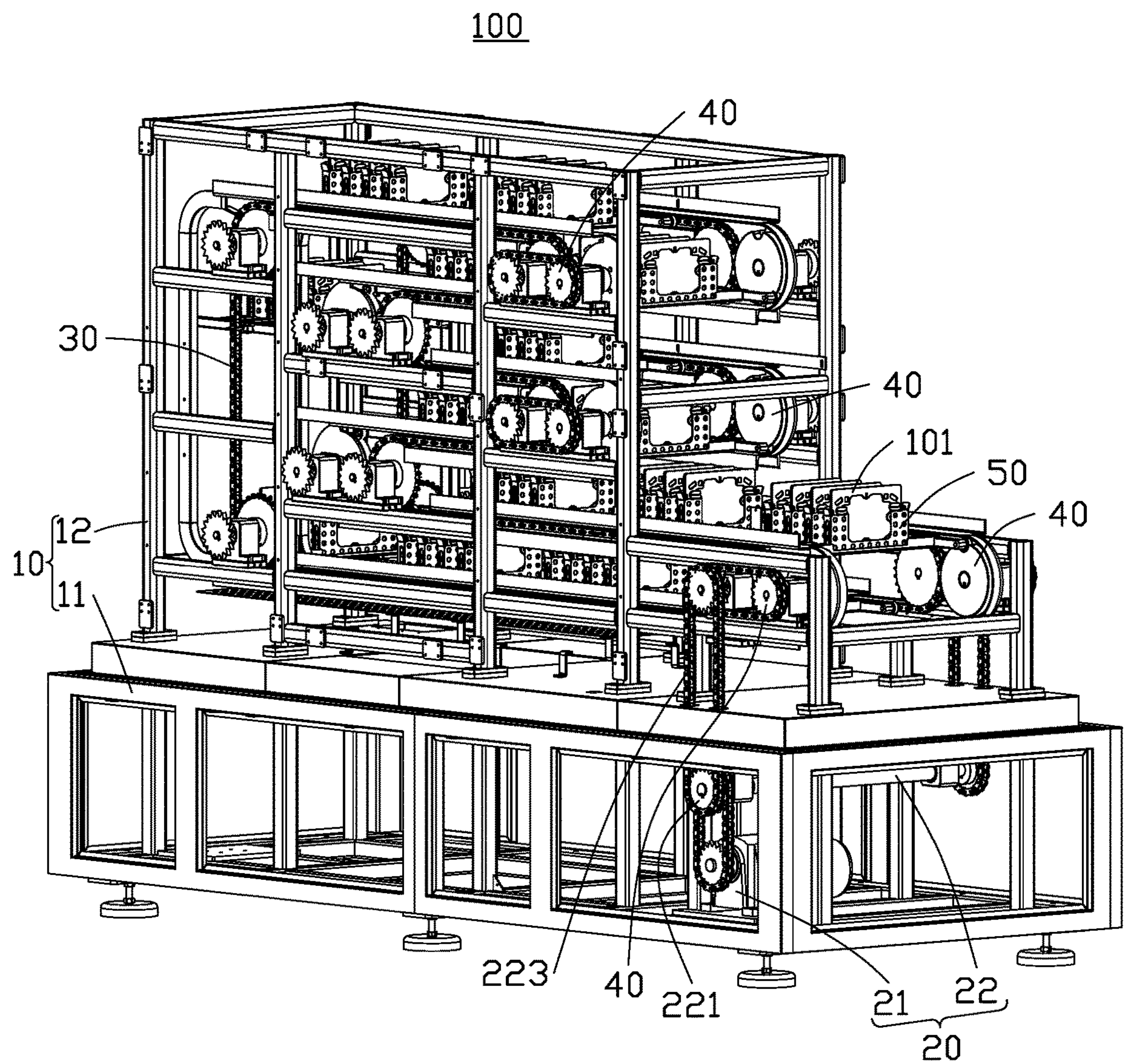
FIG. 1 is a diagrammatic view of an embodiment of a transporting device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Referring to FIG. 1, a transporting device 100 for transporting at least one product 101 is provided according to an embodiment of the present disclosure. In some embodiments, the transporting device 100 can transport a plurality of products 101 at least in a longitudinal direction and in a vertically direction. The transporting device 100 includes a mounting frame 10, a driving mechanism 20, a transmitting mechanism 30, a plurality of guiding mechanisms 40, and a supporting mechanism 50. The driving mechanism 20 and the guiding mechanisms 40 are installed on the mounting frame 10, and the transmitting mechanism 30 is connected to the guiding mechanism 40 and the supporting mechanism 50. The supporting mechanism 50 can support the products 101. The driving mechanism 20 is connected to the guiding mechanisms 40 for driving the guiding mechanisms 40 to drive the transmitting mechanism 30 to move. The driving mechanism 20 further drives the products 101 on the supporting mechanism 50 to move.

In some embodiments, the mounting frame 10 includes a base 11 and a connecting frame 12, and the connecting frame 12 is connected to the base 11. The driving mechanism 20 is disposed on a side of the base 11 away from the connecting frame 12, and the guiding mechanisms 40 are disposed on the connecting frame 12.

In one embodiment, the driving mechanism 20 includes a transmission driver 21 and a rotating shaft 22. The transmission driver 21 is installed on the base 11. The rotating shaft 22 is connected to the transmission driver 21, and is rotatably connected to the base 11 through bearing (not shown). Two ends of the rotating shaft 22 are connected to the guiding mechanisms 40. The rotating shaft 22 is driven to rotate relative to the bearing through the transmission driver 21 to drive the guiding mechanism 40. In some embodiments, gears 221 are disposed on both ends of the rotating shaft 22 and are connected to the guiding mechanisms 40 through a chain 223. In other embodiments, two ends of the rotating shaft 22 are provided with rotating wheels (not shown), which are connected to the guiding mechanisms 40 through a synchronous belt (not shown).

Figure 2:
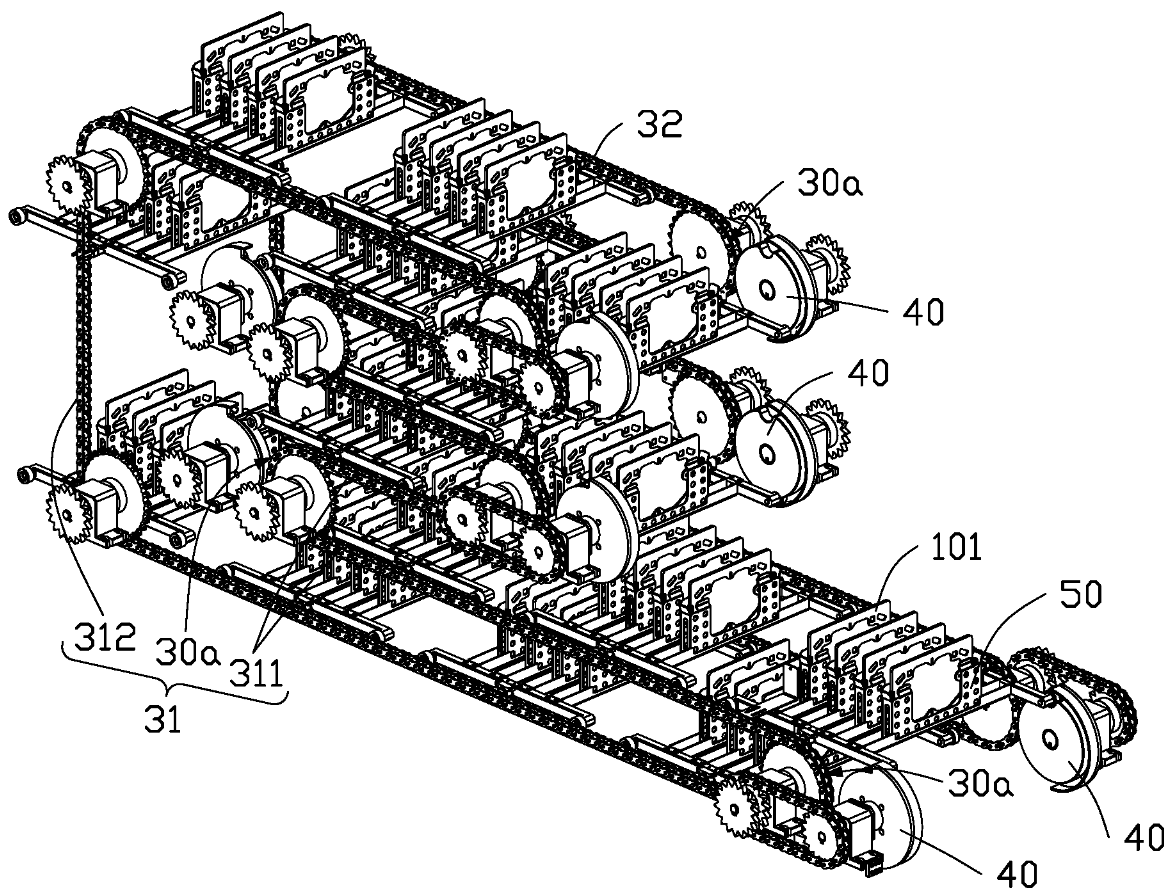
FIG. 2 is a diagrammatic view of an embodiment of a transmitting mechanism of the transporting device of FIG. 1.

Referring to FIGS. 1 and 2, in one embodiment, the transmitting mechanism 30 includes a first chain 31 and a second chain 32. The first chain 31 and the second chain 32 have the same structure and are parallel to each other. Both the first chain 31 and the second chain 32 have a plurality of bent portions **30*a* Each guiding mechanism 40 connects each corresponding bent portion 30*a*. The supporting mechanism 50 connects the first chain 31 and the second chain 32. The transmission driver 21 drives the rotating shaft 22 to rotate relative to the bearing to drive the guiding mechanism 40, and then drives the first chain 31 and the second chain 32 to rotate, so that the supporting mechanism 50 moves circularly on the first chain 31 and the second chain 32**.

In one embodiment, the first chain 31 further includes a plurality of first portion 311 and a second portion 312. Each first portion 311 extends along a horizontal direction perpendicular to the longitudinal direction. Each bent portion **30*a* is connects to two adjacent first portions 311. the second portion 312 is bent relative to the first portion 311, and the second portion 312 extends along the longitudinal direction. The products 101 are placed on one first portion 311, and the products 101 are moved to another second portion 312** through the bent portion 30*a*. The structure of the second chain 32 is the same as that of the first chain 31.

Figure 3:
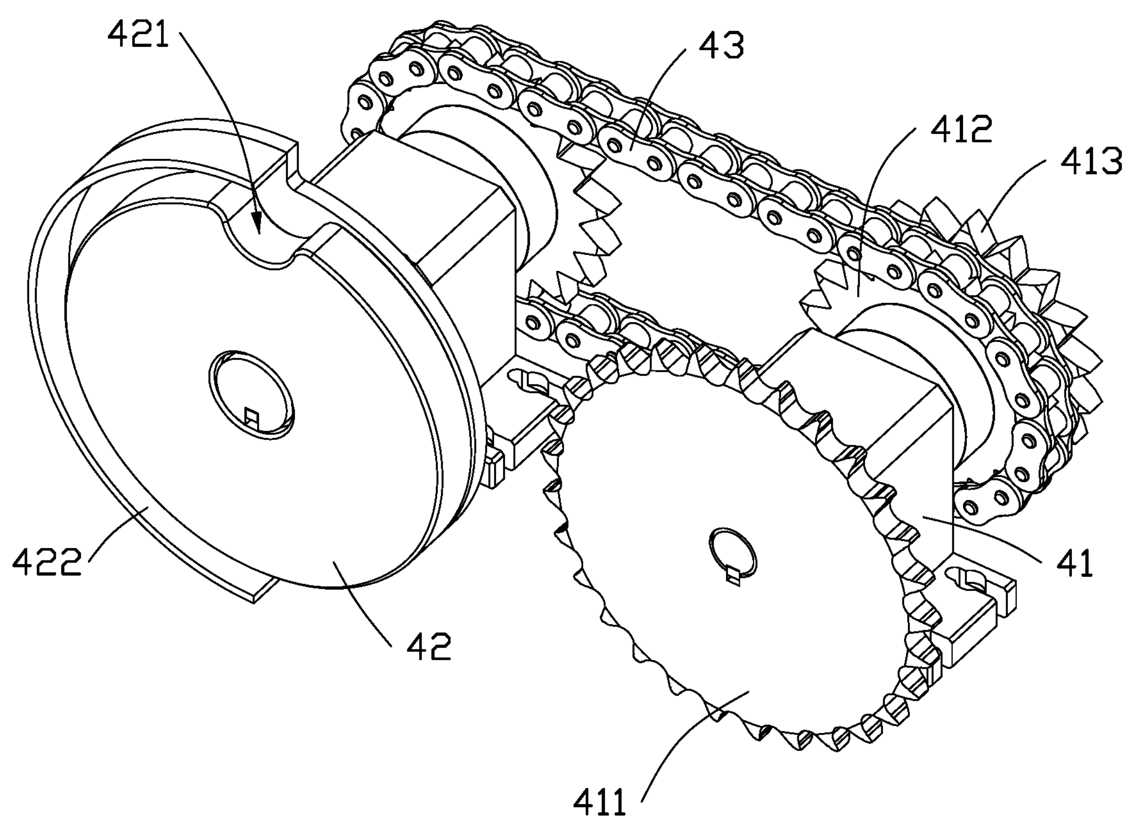
FIG. 3 is a diagrammatic view of an embodiment of a guiding mechanism of the transporting device of FIG. 1.
Figure 4:
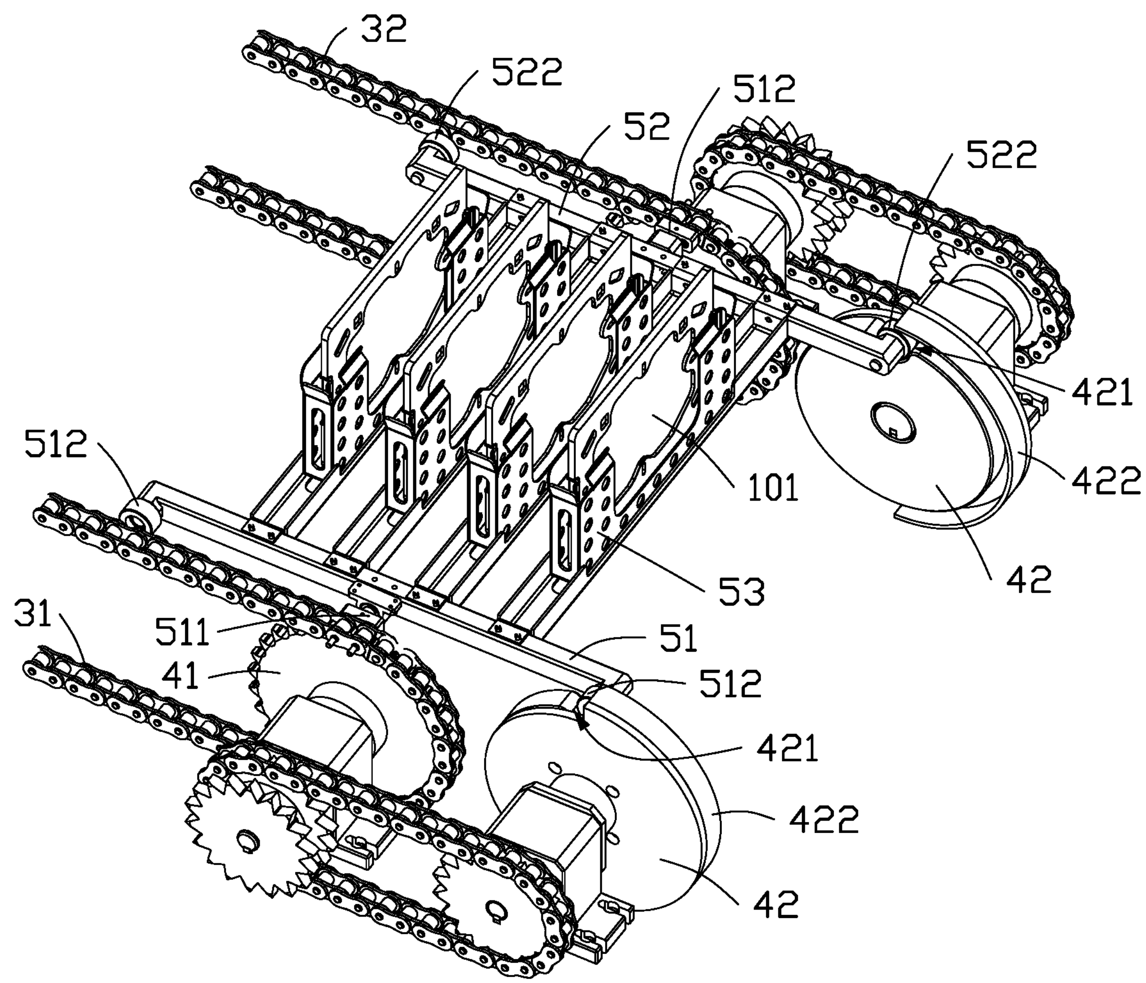
FIG. 4 is a diagrammatic view of an embodiment of a transmitting mechanism and a guiding mechanism of the transporting device of FIG. 1.

Referring to FIGS. 1, 3 and 4, each guiding mechanism 40 includes a rotating wheel 41 and a guiding plate 42. The rotating wheel 41 and the guiding plate 42 are mounted on the connecting frame 12. The rotating wheel 41 includes a first connecting portion 411 and a second connecting portion 412. The first connecting portion 411 is connected to the bent portion 30*a*, and the second connecting portion 412 is connected to the guiding plate 42. In one embodiment, the second connecting portion 412 is connected to the guiding plate 42 through a third chain 43, so that the rotating wheel 41 and the guiding plate 42 rotate synchronously. The rotating wheel 41 further includes a third connecting portion 413, and the third connecting portion 413 is connected to the rotating shaft 22. The rotating shaft 22 is driven to rotate by the transmission driver 21, and the rotating wheel 41 is driven to rotate, so that the supporting mechanism 50 moves on the first chain 31 and the second chain 32, and the supporting mechanism 50 is connected to the guiding plate 42. The third chain 43 drives the guiding plate 42 to rotate synchronously, and drives the supporting mechanism 50 to extend through the bent portion 30*a*. The supporting mechanism 50 is connected to the guiding plate 42, and the guiding plate 42 and the rotating wheel 41 rotate synchronously, to improve the stability of the supporting mechanism 50 when extending through the bent portion 30*a*, reduce the shaking amplitude of the supporting mechanism 50, and keep the products 101 in a stable state, which is convenient for processing when moving. In some embodiments, the third connecting portion 413 is connected to the rotating shaft 22 through a chain. The rotating wheel 41 connected to the rotating shaft 22 needs to be provided with the third connecting portion 413, and the rotating wheel 41 provided on the other bent portion 30*a* can omit the third connecting portion 413.

In one embodiment, the guiding plate 42 is provided with a recess 421, and the supporting mechanism 50 can be limited by the recess 421. In one embodiment, the guiding plate 42 is provided with an arc-shaped plate 422 at a periphery of the guiding plate 42, and the arc-shaped plate can limit the supporting mechanism 50 in the recess 421 when the guiding plate 42 rotates, so as to prevent the supporting mechanism 50 from detaching from the recess 421.

Figure 5:
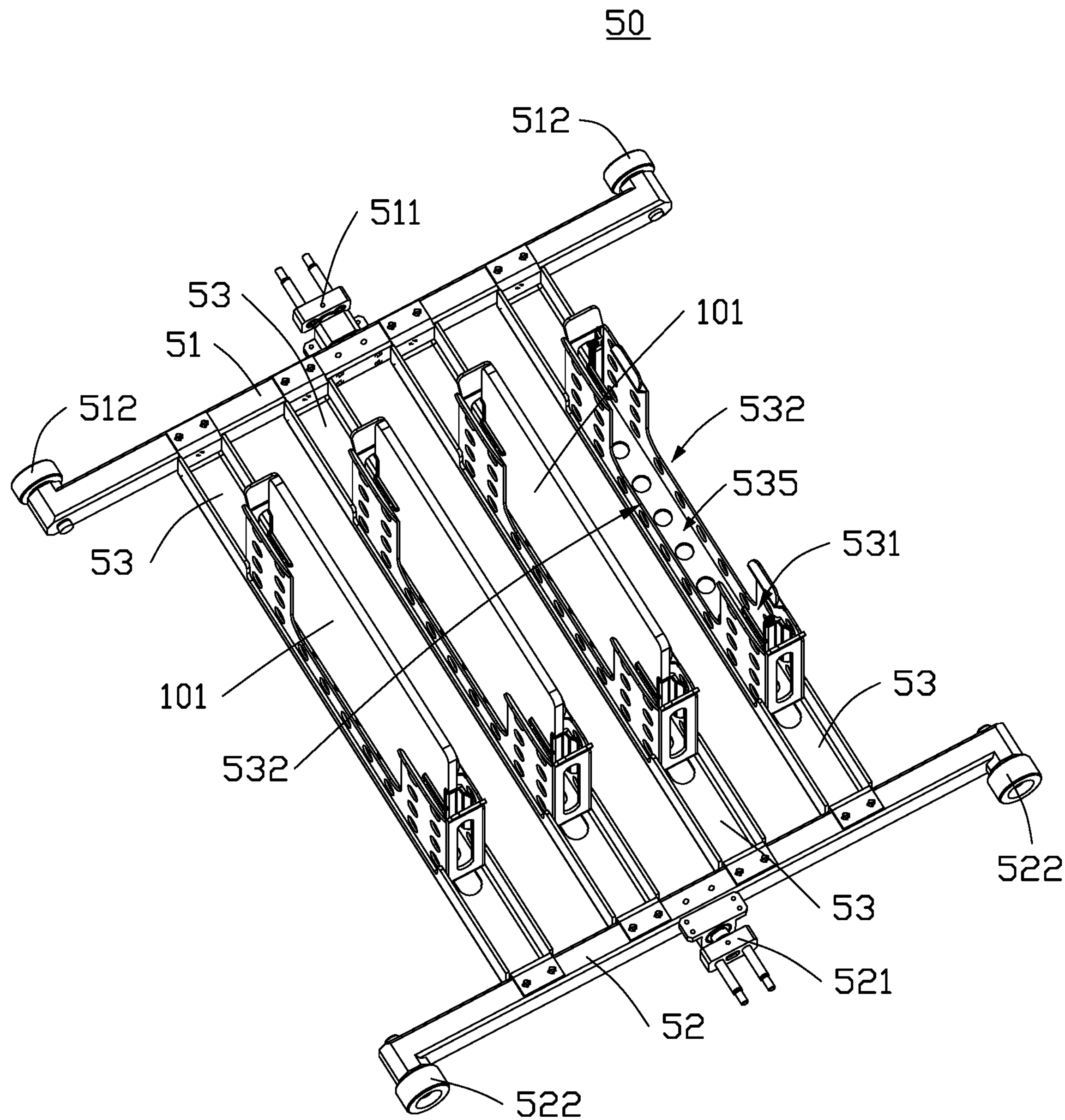
FIG. 5 is a diagrammatic view of an embodiment of a supporting mechanism of the transporting device of FIG. 1.

Referring to FIGS. 4 and 5, in one embodiment, the supporting mechanism 50 includes a first connecting rod 51, a second connecting rod 52, and at least one material holder 53. The first connecting rod 51 is provided with a first connecting member 511. The second connecting rod 52 is provided with a second connecting member 521. The first connecting member 511 is connected to the first chain 31. The second connecting member 521 is connected to the second chain 32. Two ends of the first connecting rod 51 are provided with first guiding wheels 512. Two ends of the second connecting rod 52 are provided with second guiding wheels 522. Both the first guiding wheels 512 and the second guiding wheels 522 are disposed in the corresponding recess 421 and rotate together with the guiding plate 42.

In one embodiment, the material holder 53 is connected to the first connecting rod 51 and the second connecting rod 52. The material holder 53 defines a first space 535 for placing the products 101. The material holder 53 can support the products 101 along the vertical direction, so as to increase an exposed surface area of the products 101. A first through hole 531 is defined on a surface of the material holder 53. The first through hole 531 communicates with the first space 535 for exposing the surface of the products 101. Furthermore, a first opening 532 is defined on the surface of the material holder 53 for further exposing the surface of the products 101. In one embodiment, the supporting mechanism 50 includes a plurality of material holders 53 disposed on the first connecting rod 51 and the second connecting rod 52.

When the transporting device 100 is in use, the products 101 are first placed in the material holders 53, and the driving mechanism 20 drives the first chain 31 and the second chain 32 to drive the products 101 on the material holders 53 to move. When the products 101 move to the bent porting 30*a*, the first guiding wheels 512 and the second guiding wheels 522 are disposed in the recess 421. The guiding plate 42 rotates synchronously with the rotating wheel 41, the material holders 53 is driven to pass through the bent porting 30*a*, and continues to move with the rotation of the first chain 31 and the second chain 32 until reaching another bent porting 30*a*. The above steps are repeated to drive the products 101 on the material holders 53 to move circularly along the first chain 31 and the second chain 32. The supporting mechanism 50 is connected to the guiding plate 42, and the guiding plate 42 rotates synchronously with the rotating wheel 41, thereby improving the stability of the supporting mechanism 50 when passing through the bent portion 30*a*.

Figure 6:
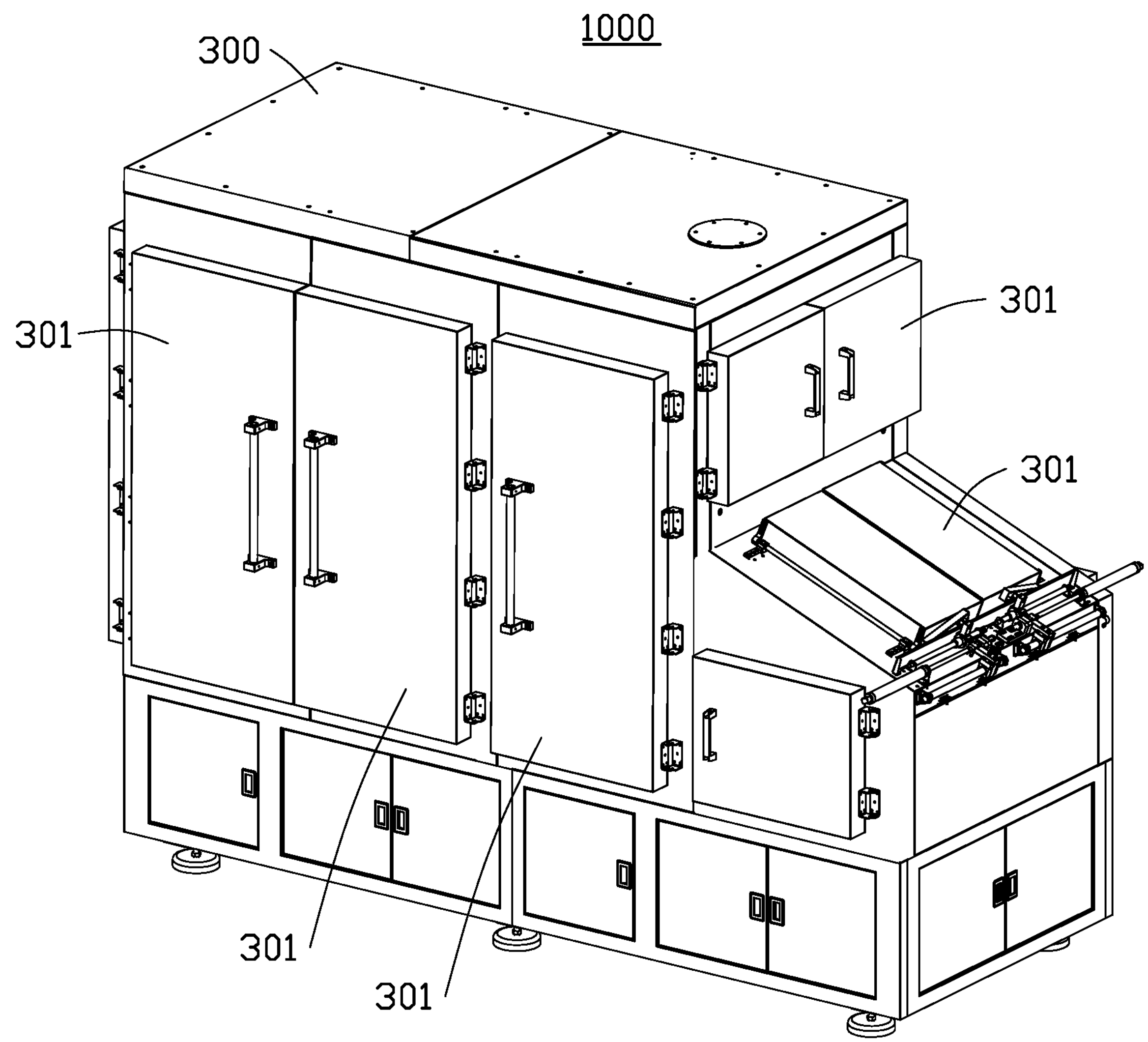
FIG. 6 is a diagrammatic view of an embodiment of a heating mechanism according to the present disclosure.
Figure 7:
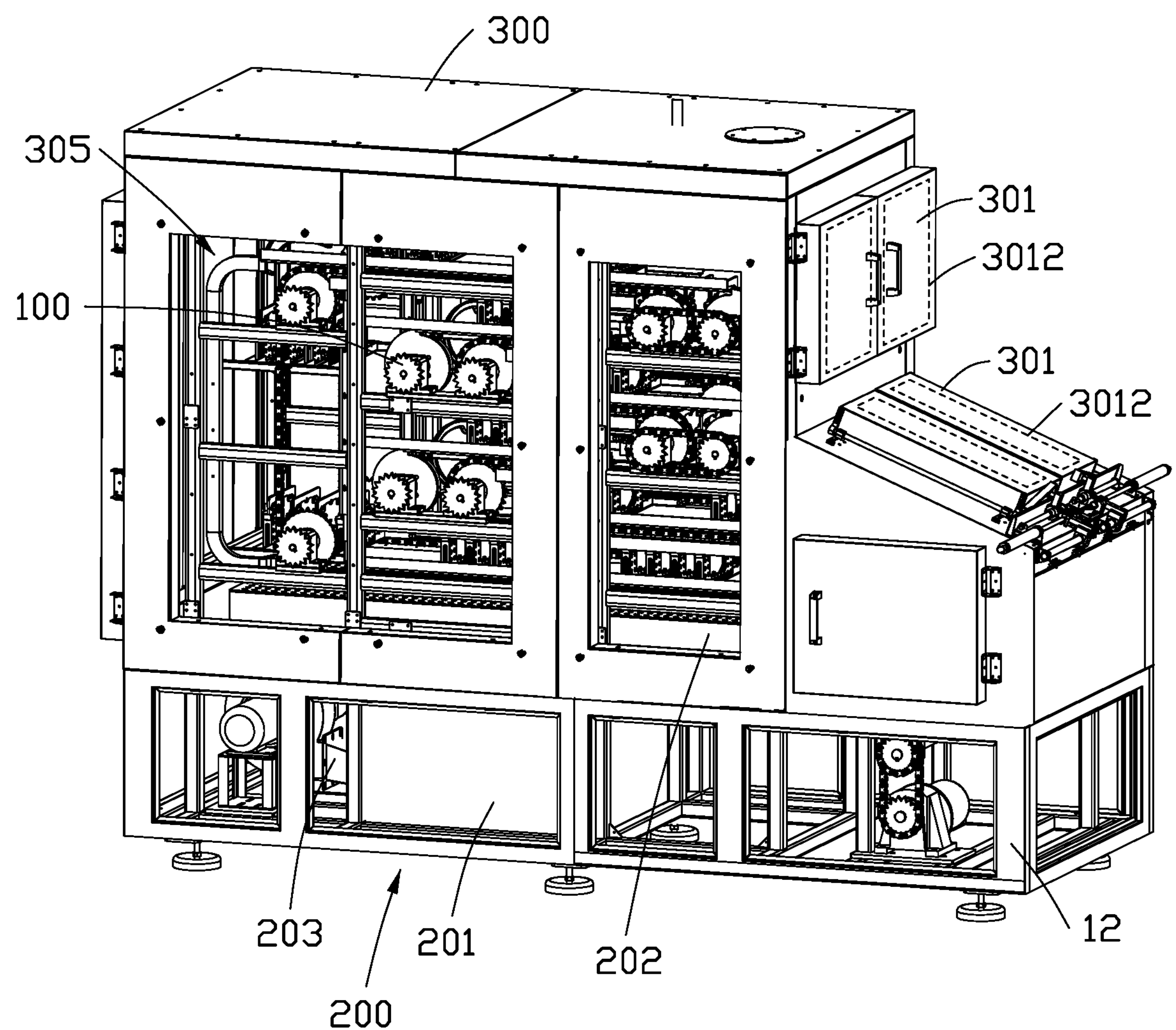
FIG. 7 is a diagrammatic view of an embodiment of a heating device according to the present disclosure.

Referring to FIGS. 6 and 7, a heating device 1000 including the transporting device 100 is provided according to an embodiment of the present disclosure. The heating device 1000 further includes a heating mechanism 200 and a housing mechanism 300. The transporting device 100 is installed in the housing mechanism 300, the heating mechanism 200 is connected to the housing mechanism 300 and can transport heat into the housing mechanism 300 to heat the products 101.

In one embodiment, the housing mechanism 300 includes a second space 305, and the transporting device 100 is disposed in the second space 305. The housing mechanism 300 is provided with a plurality of doors 301, and each door 301 is provided with a heat insulating member 3012, which is used to block the heat in the second space 305 and prevent damages to the staff.

Figure 8:
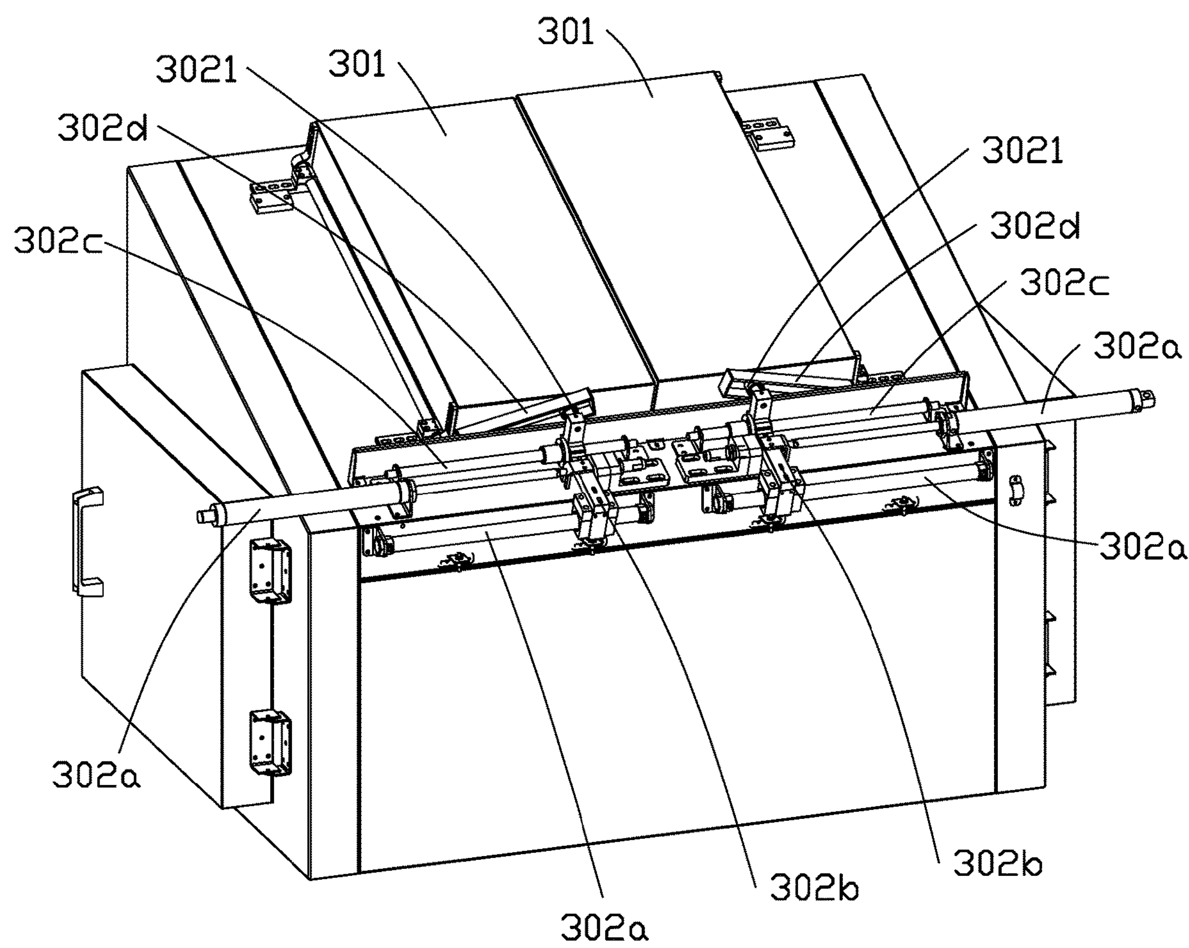
FIG. 8 is a diagrammatic view of an embodiment of internal of the heating device of FIG. 7.

Referring to FIG. 8, in one embodiment, the housing mechanism 300 further includes an opening and closing driving mechanism 302, and the opening and closing driving mechanism 302 includes an opening and closing driver 302*a*, a connecting block 302*b*, a guiding rod 302*c*, and a sliding slot 302*d*. The connecting block 302*b* connects the opening and closing driver 302*a* and the guiding rod 302*c*. A roller 3021 is provided at one end of the connecting block 302*b*. The roller 3021 is accommodated in the sliding slot 302*d*, and the sliding slot 302*d* is inclined on the door 301. The opening and closing driver 302*a* drives the connecting block 302*b* to slide relative to the guiding rod 302*c*, and drives the roller 3021 to slide in the sliding slot 302*d*, so as to drive the door body 301 to open or close automatically. In one embodiment, the heating device 1000 includes a mechanical arm (not shown), which cooperates with the opening and closing driving mechanism 302. The opening and closing driving mechanism 302 drives the door body 301 to open, and the mechanical arm places the products 101 in the material holders 53. The opening and closing driving mechanism 302 drives the door body 301 to close. After heating is completed, the mechanical arm takes out the products 101 to realize automatic loading and unloading. When there are two doors 301, each door 301 is connected to one opening and closing driving mechanism 302 to realize the opening and closing of the two doors 301.

Figure 9:
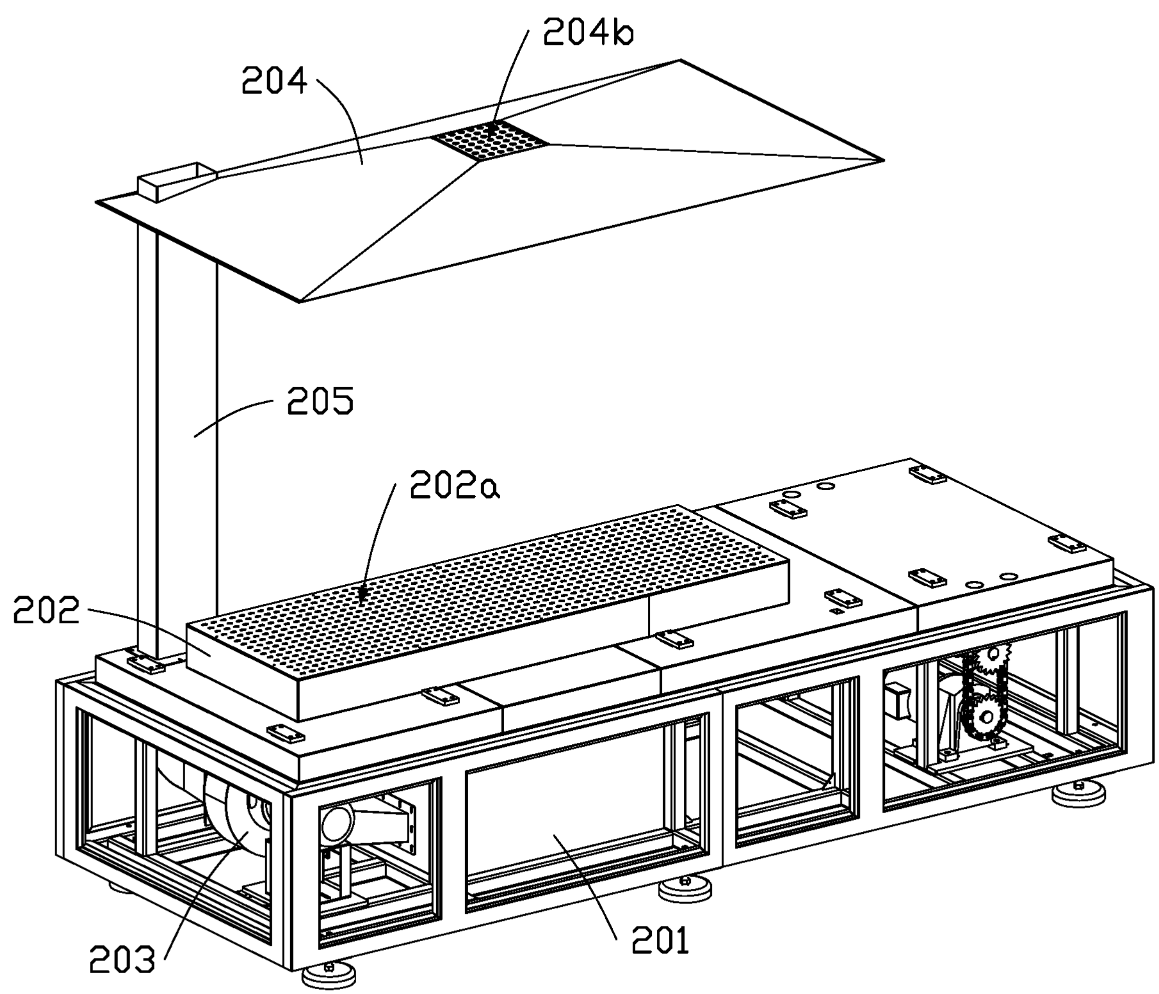
FIG. 9 is a diagrammatic view of an embodiment of a heating mechanism of the heating device of FIG. 7.

Referring to FIGS. 1 and 9, in one embodiment, the heating mechanism 200 includes a heating box 201 and a first baffle 202. The heating box 201 is provided on the connecting frame 12. A second opening (not shown) is defined on the connecting frame 12. The first baffle 202 is provided on the connecting frame 12 and covers the second opening. The first baffle 202 is disposed in the second space 305 and connected to the heating box 201. A second through hole 202*a* is defined on the first baffle 202. The heating box 201 transports heat into the second space 305 through the second through hole 202*a* to heat the products 101. The hot air is dispersed in the second space 305 through the second through hole 202*a*, so that the hot air is evenly transported to a surface of each product 101 to avoid directly acting on the products 101 at the bottom and affecting the quality of the products 101. Further, the hot air of the heating box 201 is sent from the bottom to a top of the second space 305. The products 101 are vertically placed in the material holders 53, and a direction in which the product 101 is placed is the sane as a direction of the hot air, so as to prevent the products 101 from being placed horizontally. The surface of each product 101 when placed blocks the flow of hot air, thereby improving the flow of hot air and allowing the heat to spread more evenly on the products 101. The first through hole 531 and the first opening 532 are defined in the material holders 53 to expose the surface of the products 101, which facilitates the hot air to contact the products 101 and improves the heating effect.

In one embodiment, when the supporting mechanism 50 moves to the first portion 311, when viewed along the longitudinal direction, a projection of the supporting mechanism 50 disposed in the first portion 311 at least partially overlaps with a projection of the first baffle 202. In one embodiment, when viewed along the longitudinal direction, the projection of the material holders 53 disposed in the first portion 311 is disposed within the projection of the first baffle 202, so that the surface of the first baffle 202 covers a movement range of the material holders 53, further spreading the heat evenly on the products 101 of each material holders 53. In one embodiment, when viewed along the longitudinal direction, both the projection of the first portion of the first chain 31 and the projection of the first portion of the second chain 32 are disposed within the projection of the first baffle 202.

Figure 10:
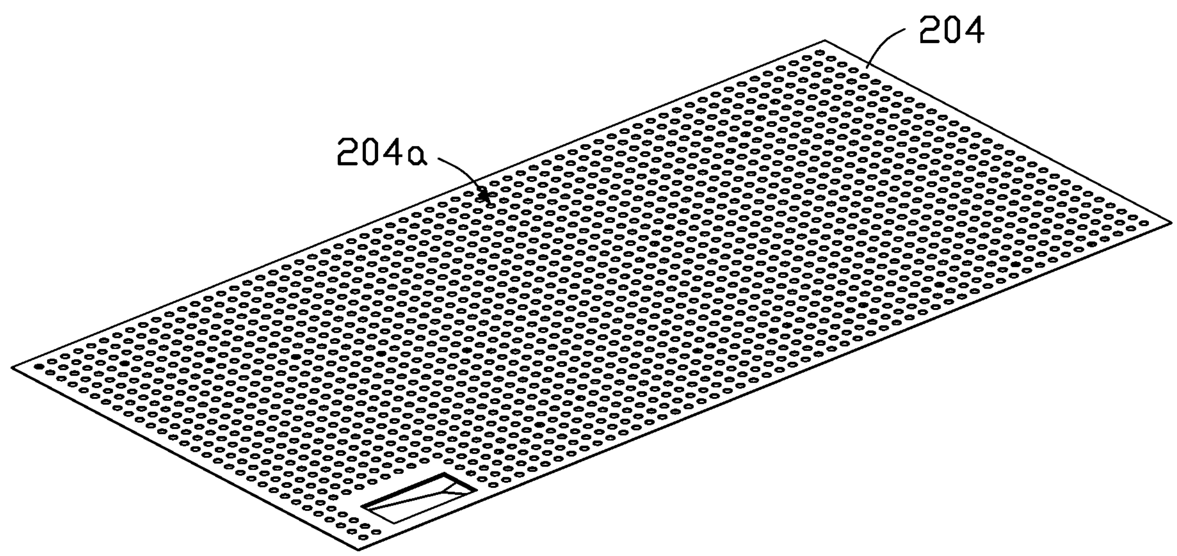
FIG. 10 is a diagrammatic view of an embodiment of a second baffle of the heating device of FIG. 7.

Referring to FIG. 10, in one embodiment, the heating mechanism 200 further includes an exhaust driver 203, a second baffle 204, and a pipeline 205. The exhaust driver 203 is connected to the heating box 201, one end of the pipeline 205 is connected to the exhaust driver 203, and the other end is connected to the second space 305. The second baffle 204 is disposed on the top of the second space 305 and connected to the inner wall of the housing mechanism 300. A gap is defined between the second baffle 204 and the top of the housing mechanism 300. The second baffle 204 and the first baffle 202 are disposed opposite each other in the longitudinal direction. The second baffle 204 defines a third space, a third through hole 204*a*, and a fourth through hole 204*b*. Both the third through hole 204*a* and the fourth through hole 204*b* are connected to the third space. The exhaust driver 203 extracts heat in the second space 305 and transports the extracted heat it to the gap between the second baffle 204 and the top of the housing mechanism 300 through the pipeline 205. Then the heat enters the third space through the fourth through hole 204*b*, and is dispersed into the second space 305 through the third through hole 204*a*. The hot air is dispersed in the second space 305 through the third through hole 204*a*, so that the hot air is evenly transported to the surface of each product 101. The hot air in the second space 305 is recycled through the exhaust driver 203, and the first baffle 202 and the second baffle 204 are used to transport the hot air into the second space 305, thereby improving heating efficiency and saving energy. In one embodiment, along the longitudinal direction, the projection of the first baffle 202 is disposed within the projection of the second baffle 204.

In one embodiment, the heating mechanism 200 further includes a thermocouple, which is disposed in the second space 305 for monitoring the temperature in the second space 305. In one embodiment, the heating mechanism 200 further includes a controller electrically connected to the thermocouple for outputting the temperature curve in the second space 305 in real time to accurately control the temperature in the second space 305.

When the heating device 1000 is in use, the products 101 are first placed in the material holders 53 through the robotic arm. The products 101 are then circulated and moved on the transmitting mechanism 30 through the transmission device 100. The heating box 201 disperses hot air into the second space 305 through the second through hole 202*a*. The exhaust driver 203 disperses the hot air in the second space 305 through the third through hole 204*a*, so that the hot air can be evenly transported to the surface of the circulatingly moving products 101 to heat the products 101.

The heating device 1000 reduces the occupied space through the longitudinally disposed transmitting mechanism 30, and evenly diffuses heat on the products 101 through the first baffle 202 and second baffle 204 to improve the heating effect and product quality.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A transporting device configured to transport at least one product, the transporting device comprising:

a mounting frame;

a driving mechanism connected to the mounting frame;

a transmitting mechanism comprising a plurality of bent portions;

a plurality of guiding mechanisms connected to the mounting frame, each of the plurality of guiding mechanisms comprising a rotating wheel and a guiding plate, each of the plurality of bent portions being connected to the rotating wheel of a corresponding one of the plurality of guiding mechanisms, the guiding plate being connected to the rotating wheel; and a supporting mechanism connected to the transmitting mechanism, the supporting mechanism being configured to support the at least one product, wherein the driving mechanism is further connected to the rotating wheel and configured to drive the transmitting mechanism to rotate to drive the supporting mechanism to move; the driving mechanism is further connected to the guiding plate, the guiding plate and the rotating wheel are configured to synchronously rotate to drive the supporting mechanism to pass through each of the plurality of bent portions.

2. The transporting device of the claim 1, wherein the supporting mechanism comprises a plurality of first guiding wheels, the guiding plate defines a recess, and one of the plurality of first guiding wheels is disposed in the recess.

3. The transporting device of the claim 2, wherein an arc-shaped plate is provided at a periphery of the guiding plate, and the arc-shaped plate is configured to limit the supporting mechanism in the recess when the guiding plate rotates.

4. The transporting device of the claim 1, wherein the transmitting mechanism further comprises a first chain and a second chain, each of the first chain and the second chain is connected to the rotating wheel, the supporting mechanism is connected to each of the first chain and the second chain, and the driving mechanism is further configured to drive the supporting mechanism to move cyclically on each of the first chain and the second chain.

5. The transporting device of the claim 4, wherein the first chain comprises a plurality of first portion, a second portion, and the plurality of bent portions, each of the plurality of first portions extends along a horizontal direction, and the second portion extends along a longitudinal direction perpendicular to the horizontal direction, each of the plurality of bent portions connects two adjacent first portions of the plurality of first portions.

6. The transporting device of the claim 1, wherein the supporting mechanism comprises at least one material holder, the at least one material holder defines a first space configured for placing the at least one product, a first through hole and a first opening are defined on the at least one material holder, each of the first through hole and the first opening communicates with first space for exposing a surface of the at least one product.

7. The transporting device of the claim 1, wherein the mounting frame comprises a base and a connecting frame connected to the base, the driving mechanism is disposed on a side of the base away from the connecting frame, and the plurality of guiding mechanisms is disposed on the connecting frame.

8. The transporting device of the claim 7, wherein the driving mechanism comprises a transmission driver and a rotating shaft, the transmission driver is installed on the base, the rotating shaft is connected to the transmission driver, the rotating shaft is further rotatably connected to the base, and each end of the rotating shaft is connected to the plurality of guiding mechanisms.

9. A heating device comprising:

a heating mechanism;

a housing mechanism; and a transporting device comprising:

a mounting frame;

a driving mechanism connected to the mounting frame;

a transmitting mechanism comprising a plurality of bent portions;

a plurality of guiding mechanisms connected to the mounting frame, each of the plurality of guiding mechanisms comprising a rotating wheel and a guiding plate, each of the plurality of bent portions being connected to the rotating wheel of a corresponding one of the plurality of guiding mechanisms, the guiding plate being connected to the rotating wheel; and a supporting mechanism connected to the transmitting mechanism, the supporting mechanism being configured to support the at least one product, wherein the driving mechanism is further connected to the rotating wheel and configured to drive the transmitting mechanism to rotate to drive the supporting mechanism to move;

the driving mechanism further is connected to the guiding plate, the guiding plate and the rotating wheel are configured to synchronously rotate to drive the supporting mechanism to pass through each of the plurality of bent portions;

the transporting device comprising installed in the housing mechanism, the heating mechanism connected to the housing mechanism and configured to transport heat into the housing mechanism to heat the at least one product.

10. The heating device of the claim 9, wherein the supporting mechanism comprises a plurality of first guiding wheels, the guiding plate defines a recess, and one of the plurality of first guiding wheels is disposed in the recess.

11. The heating device of the claim 10, wherein an arc-shaped plate is provided at a periphery of the guiding plate, and the arc-shaped plate is configured to limit the supporting mechanism in the recess when the guiding plate rotates.

12. The heating device of the claim 9, wherein the transmitting mechanism further comprises a first chain and a second chain, each of the first chain and the second chain is connected to the rotating wheel, the supporting mechanism is connected to each of the first chain and the second chain, and the driving mechanism is further configured to drive the supporting mechanism to move cyclically on each of the first chain and the second chain.

13. The heating device of the claim 12, wherein the first chain comprises a plurality of first portion, a second portion, and the plurality of bent portions, each of the plurality of first portions extends along a horizontal direction, and the second portion extends along a longitudinal direction perpendicular to the horizontal direction, each of the plurality of bent portions connects two adjacent first portions of the plurality of first portions.

14. The heating device of the claim 9, wherein the supporting mechanism comprises at least one material holder, the at least one material holder defines a first space configured for placing the at least one product, a first through hole and a first opening are defined on the at least one material holder, each of the first through hole and the first opening communicates with first space for exposing a surface of the at least one product.

15. The heating device of the claim 9, wherein the mounting frame comprises a base and a connecting frame connected to the base, the driving mechanism is disposed on a side of the base away from the connecting frame, and the plurality of guiding mechanisms is disposed on the connecting frame.

16. The heating device of the claim 15, wherein the driving mechanism comprises a transmission driver and a rotating shaft, the transmission driver is installed on the base, the rotating shaft is connected to the transmission driver, the rotating shaft is further rotatably connected to the base, and each end of the rotating shaft is connected to the plurality of guiding mechanisms.

17. The heating device of claim 9, wherein the heating mechanism comprises a heating box and a first baffle, the first baffle is disposed in the housing mechanism and connected to the heating box, a second through hole is defined on the first baffle, the heating box is configured to transport heat into the housing mechanism through the second through hole to heat the at least one product.

18. The heating device of claim 17, wherein the heating device further comprises an exhaust driver, a second baffle, and a pipeline, the exhaust driver is connected to the heating box, one end of the pipeline is connected to the exhaust driver, and another end of the pipeline is connected to inside of the housing mechanism, the second baffle is disposed on a top of the housing mechanism, a third through hole is defined on the second baffle, the exhaust driver is configured to extract heat in the housing mechanism and transport the extracted heat from the third through hole into the housing mechanism through the pipeline.

19. The heating device of claim 9, wherein the housing mechanism is provided with a plurality of doors, and each of the plurality of doors is provided with a heat insulating member.

* * * * *